Patented Aug. 14, 1923.

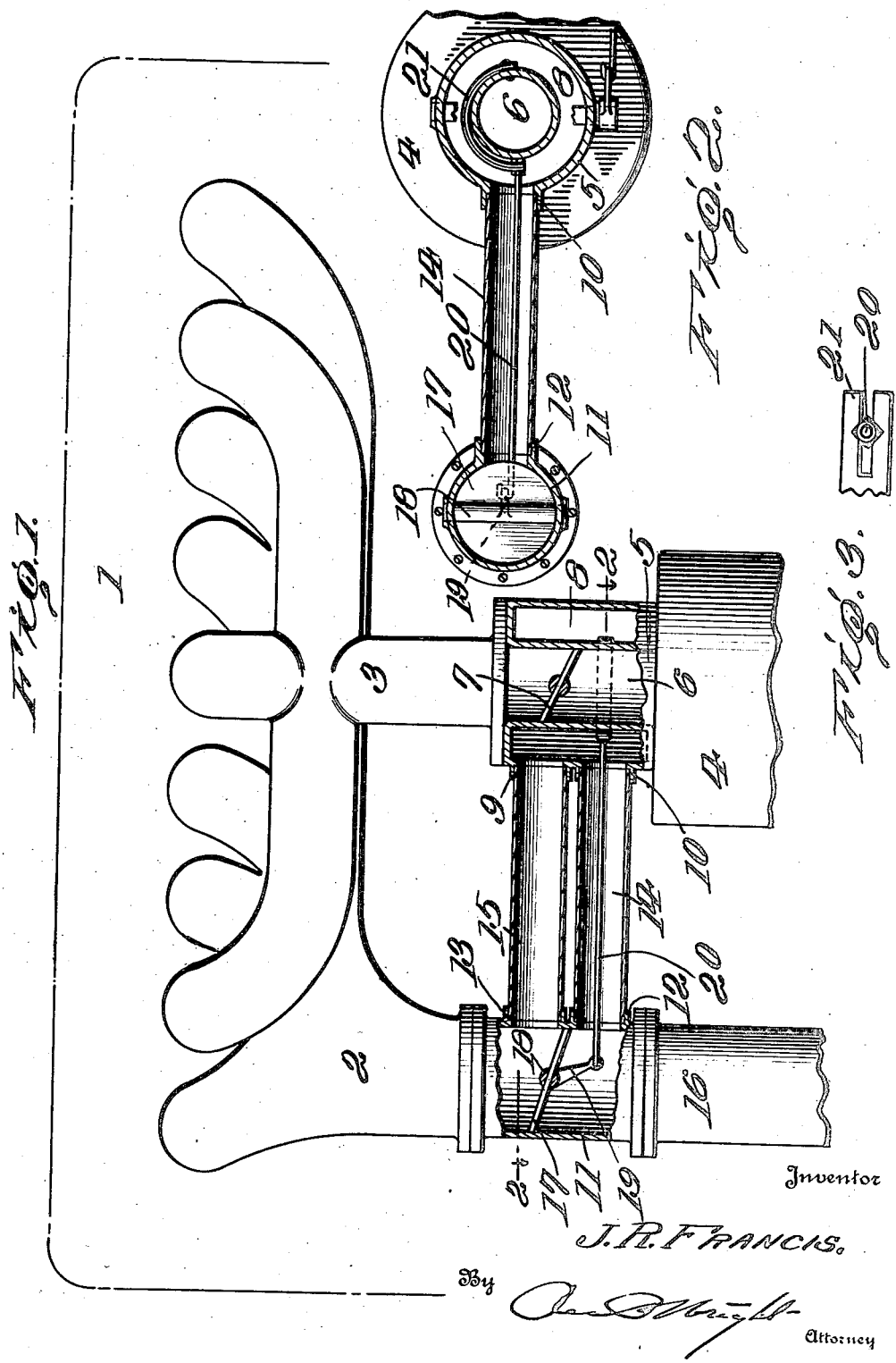

1,464,759

UNITED STATES PATENT OFFICE.

JACOB RICHARD FRANCIS, OF FLINT, MICHIGAN.

THERMOSTATIC HEAT CONTROL FOR INTERNAL-COMBUSTION ENGINES.

Application filed November 16, 1920. Serial No. 424,911.

*To all whom it may concern:*

Be it known that I, JACOB RICHARD FRANCIS, a citizen of the United States, residing at Flint, in the county of Genesee and State of Michigan, have invented certain new and useful Improvements in Thermostatic Heat Controls for Internal-Combustion Engines, of which the following is a specification, reference being had therein to the accompanying drawing.

This invention relates to thermostatic heat control for internal combustion engines, the object being to provide a thermostat which is subjected to the heat of the exhaust gases passing into the heating jacket which will regulate the degree of temperature of the gases within the heating jacket for producing a charge heating device whereby the temperature of the charge passing into the internal combustion engine can be automatically regulated.

A further object of the invention is to provide a construction which eliminates the change of the construction of the induction pipe or carbureter in any way, the heating chamber being formed of a casting disposed between the charge forming device and the intake manifold and having arranged therein a thermostat which is connected to a valve in the exhaust line pipe.

Other and further objects and advantages of the invention will be hereinafter set forth and the novel features thereof defined by the appended claims.

In the drawings,

Figure 1 is a side elevation of an internal combustion engine showing the application of my improved thermostatic heat control thereto partly in section;

Figure 2 is a section taken on line 2—2 of Figure 1; and

Figure 3 is a detail view of the thermostatic element showing the manner of connecting the same to the operator rod.

In the drawings 1 indicates an internal combustion engine, 2 the exhaust manifold and 3 the intake manifold which may be of the ordinary construction now in use. Disposed beneath the intake manifold 3 and above the carbureter or charge forming device 4 is a casting 5 forming a unit which can be readily placed in position between the charge forming device and the intake manifold and is herein shown provided with a carbureting passage 6 having a throttle valve 7 mounted therein but it is of course understood that the ordinary throttle employed in charge forming devices can be used and I do not wish to limit myself to the use of a throttle separate from the charge forming device.

The casting is provided with an annular chamber 8 having an inlet nipple 9 and outlet nipple 10 forming an inlet and outlet for the exhaust gases in order to heat the carbureting passage so that the charge in its passage to the engine will be heated so as to produce a highly efficient explosive charge.

The exhaust manifold 2 has connected thereto a valve casing 11 provided with an inlet and outlet nipple 12 and 13 which are connected to the inlet and outlet nipples of the casting 5 by pipes 14 and 15 whereby the exhaust gases can be diverted out of their normal path of travel so as to cause the same to circulate in the heating chamber surrounding the carbureting passage or induction pipe of the internal combustion engine. The valve casing 11 is connected to the exhaust line pipe 16 which extends to the muffler in the ordinary way.

Mounted within the valve casing 11 is a valve 17 carried by stem 18 extending transversely therethrough having an arm 19 to which is connected a link 20 which has its free end loosely connected to the free end of a bowed thermostatic element 21 disposed within the heating chamber 8, the link being disposed within the pipe 14 and by this construction all of the parts of the thermostatic heat control are disposed within casings and when the valve is in the position shown the entire volume of gases passing out of the exhaust pipe will circulate through the heating chamber 8 and as the temperature of the chamber increases the thermostatic element expands and forces the rod outwardly which rocks the valve on its stem so as to allow a portion of the gases to pass directly out through the exhaust line pipe without being diverted into the heating chamber.

By this construction the temperature of the gases passing into the heating chamber is automatically controlled by a thermostat disposed therein and connected to a valve in the exhaust line pipe in such a manner that the temperature of the explosive charge delivered to the engine will be controlled so as to prevent overheating of the charge.

From the foregoing description it will be seen that I have provided a thermostatic heat control for an internal combustion engine which is so constructed that the same can be readily installed on any of the well known makes of engines now in use by simply inserting in the exhaust line pipe a valve casing and placing a casting above the charge forming device and connecting the two together by the pipes in order to produce novel means for automatically regulating the temperature of the charge in its passage to the engine.

What I claim is:—

1. An internal combustion engine having an exhaust pipe, intake manifold and charge forming device connected thereto; a heater arranged to heat the charge in its passage from the charge forming device to the engine, a pipe connecting said heater to said exhaust pipe, a valve disposed in the exhaust pipe, a thermostat disposed in said heater, and a rod arranged within said pipe having its ends connected respectively with said valve and thermostat for regulating the exhaust gases passing from said exhaust pipe to said heater.

2. An internal combustion engine having an exhaust pipe, intake manifold and charge forming device connected thereto, a heater arranged to heat the charge in its passage from the charge forming device to the engine having inlet and outlet pipes connected to the exhaust pipe, a valve disposed in the exhaust pipe between the inlet and outlet of the connection with said heater, a bowed thermostatic member mounted within said heater, and a link connecting said thermostatic member to said valve, said link being disposed within one of the pipes connecting said heater to said exhaust pipe.

3. An internal combustion engine having an exhaust pipe, intake manifold and charge forming device connected thereto, a heater arranged to heat the charge in its passage to the engine provided with inlet and outlet nipples, a valve casing disposed in the exhaust line pipe having inlet and outlet nipples, pipes connecting the inlet and outlet nipples of said valve casing to inlet and outlet nipples of said heater, a valve disposed in said valve casing having an arm, a bowed shaped thermostatic member arranged within said heater and a link connected to the arm of said valve extending through one of the pipes leading to the heater having its end loosely connected to the free end of the thermostatic member.

4. In a thermostatic heat control for internal combustion engines, the combination of an engine having an exhaust pipe, intake manifold and charge forming device connected thereto, of a heater arranged to heat the charge in its passage to the engine, said heater being in communication with said exhaust pipe through a pair of unclosable passages, a valve mounted in the exhaust pipe and a thermostat mounted in the heater having a connection with said valve through the medium of a link extending through one of said unclosable passages.

5. An internal combustion engine having an exhaust pipe, intake manifold and charge forming device connected thereto, a heater arranged to heat the charge in its passage to the engine having an inlet and outlet pipe connected to the exhaust pipe, a valve disposed in the exhaust pipe, a thermostat disposed within said heater and means extending through the outlet of said heater into said exhaust pipe having a connection with said valve.

In testimony whereof I have hereunto affixed my signature in the presence of two witnesses.

JACOB RICHARD FRANCIS.

Witnesses:
WILLIAM L. TIKKA,
GEO. TAFT.